(12) United States Patent
Sakai et al.

(10) Patent No.: US 7,556,883 B2
(45) Date of Patent: Jul. 7, 2009

(54) CURRENT COLLECTOR OF LEAD-ACID STORAGE BATTERY, AND LEAD-ACID STORAGE BATTERY

(75) Inventors: Masanori Sakai, Hitachiota (JP); Yasuo Kondo, Hitachinaka (JP); Kyoko Honbo, Hitachinaka (JP); Tokiyoshi Hirasawa, Ogawa (JP); Masayuki Terada, Ide (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 704 days.

(21) Appl. No.: 11/211,636

(22) Filed: Aug. 26, 2005

(65) Prior Publication Data

US 2006/0046148 A1 Mar. 2, 2006

(30) Foreign Application Priority Data

Aug. 26, 2004 (JP) ............................. 2004-246350

(51) Int. Cl.
*H01M 2/14* (2006.01)
*H01M 4/56* (2006.01)
*H01M 4/66* (2006.01)

(52) U.S. Cl. .................. 429/129; 429/225; 429/245
(58) Field of Classification Search ................. 429/129, 429/225, 245
See application file for complete search history.

(56) References Cited

FOREIGN PATENT DOCUMENTS

| JP | 60-009061 | * | 1/1985 |
| JP | 2002-100347 | * | 4/2002 |

* cited by examiner

*Primary Examiner*—Dah-Wei D Yuan
*Assistant Examiner*—Alexander Chuang
(74) *Attorney, Agent, or Firm*—Antonelli, Terry, Stout & Kraus, LLP.

(57) ABSTRACT

An object of the present invention is to take fundamental measures against the phenomenon that the positive current collector of a lead-acid battery elongates due to corrosion, in consideration of a mechanism, and to inhibit corrosion elongation. A current collector is prepared by the steps of: mixing a lead oxide of pinning compounds for inhibiting recrystallization with the atomized powder of lead or a lead alloy; and then powder-rolling the mixture. A lead-acid battery is composed with the use of the current collector.

3 Claims, 5 Drawing Sheets

50 μm

50 μm

50 μm

50 μm

50 μm

CURRENT COLLECTOR OF LEAD-ACID STORAGE BATTERY, AND LEAD-ACID STORAGE BATTERY

BACKGROUND OF THE INVENTION

1. Field of the Invention

The present invention relates to a battery technology, and particularly relates to a technology for extending the life of and improving the reliability of a lead-acid storage battery.

2. Background Art

A lead-acid storage battery is particularly superior in low-temperature characteristics among secondary batteries (storage batteries), and is a secondary battery which balances battery characteristics with cost competitiveness. A lead-acid battery has a heavier weight per unit volume than a lithium secondary battery has, and has had a basic problem with energy density. The causes of the problem are the use of an electrode of lead having a greater specific gravity than that of lithium or the like, and the use of sulfuric acid having a high specific gravity for an electrolytic solution. However, a wound type lead-acid storage battery structured by making the lead electrode as thin as possible to increase an electrode area per unit weight and winding up a negative electrode and a positive electrode while sandwiching a separating film between them is expected to have a high energy density. If a battery is composed of wound up electrodes with a thin film shape, it can be lightweight, possess a large area, and consequently acquire the high energy density.

However, because a current collector in a lead-acid battery is corroded in a working environment of the battery, the thinning of a current collector has basic problems with reliability. Particularly, the intergranular corrosion particularly among corrosions of a positive electrode material and the elongation phenomenon of the current collector due to the corrosion are problems which lead to the failure of the battery. Because corrosion elongation finally leads to troubles such as electric short and the penetration of the current collector through an electrical component, it becomes a basic problem of the current collector in a lead-acid battery particularly employing a reinforced material such as a current collector grid containing calcium Ca, regardless of an industrial battery or an automotive battery.

JP Patent Publication (Kokai) No. 3-261071 discloses a method for inhibiting the corrosion elongation of a positive current collector in a lead-acid storage battery by enhancing a material strength, as a so-called anti-corrosion-elongation measure.

SUMMARY OF THE INVENTION

In order to reduce the weight of a lead-acid battery and increase the output, it is necessary to thin a current collector, prepare the current collector having a maximized area with lead or a lead alloy of the same weight and compose a battery by using it. The intergranular corrosion and corrosion elongation phenomenon of the current collector are particularly high-risk factors in a technology of highly functionalizing the battery by thinning the current collector of the lead-acid battery, and therefore are big problems. This is specifically because the thinner is a current collector, the higher is the probability that the intergranular corrosion early causes intergranular penetrating corrosion, and the earlier appears the corrosion elongation phenomenon.

The corrosion elongation of lead and a lead alloy is caused by a stress formed in the interface between a current collector and a corrosion reaction product, which is further caused by growth of the corrosion reaction product and a charging reaction product on the surface of lead and the lead alloy. Because the corrosion elongation finally leads to troubles such as electric short and the penetration of the current collector through an electrical component, countermeasures for them are important in a positive electrode.

The corrosion product of metallic lead of a current collector is mainly lead sulfate $PbSO_4$ and lead dioxide $PbO_2$. Particularly, $PbO_2$ is produced during a charging reaction and $PbSO_4$ is produced during a discharging reaction. In addition to the charging and discharging reactions, a positive current collector is placed in the state of constantly making a corrosion reaction proceed, because lead of the positive electrode in a lead-acid battery is stable in the form of a divalent lead ion in sulfuric acid when placed in a range of a positive electrode potential, regardless of a discharging reaction period or a charging reaction period, as shown in a thermodynamic pH-potential diagram. Because particularly the positive electrode is controlled into a more positive potential in the charging reaction than a potential in an open circuit, the positive current collector is placed in a condition in which lead more actively changes to $PbO_2$ through $PbSO_4$ of a corrosion reaction product.

Except an oxygen-generating reaction, the following reactions mainly occur in a charging period when corrosion most easily proceeds.

$$Pb \text{ (a current collector)} \rightarrow Pb^{2+} + 2e \qquad (1)$$

$$Pb^{2+} + SO_4^{2-} \longleftrightarrow PbSO_4 \text{ (deposition on a current collector)} \qquad (2)$$

An expression (1) shows a starting reaction of the corrosion reaction of a current collector in itself, and according to an expression (2), a lead ion changes to lead sulfate on the grain boundaries and surface of the current collector. Lead sulfate forms dissociation equilibrium, but the equilibrium reaction of the expression (2) inclines far to the right. Because the lead sulfate is finally changed to $PbO_2$ during a charging reaction according to the following expressions (3) and (4), $PbO_2$ grows during the charging reaction in the interface between the current collector and sulfuric acid. Lead sulfate in the expression (2) is one of the reaction active materials of a positive electrode, and relates to the charging and discharging reactions of a positive electrode in the following reactions.

$$PbSO_4 \longleftrightarrow Pb^{2+} + SO_4^{2-} \text{ (dissociation equilibrium)} \qquad (3)$$

$$Pb^{2+} + 2H_2O \longleftrightarrow PbO_2 + 4H^+ + 2e \qquad (4)$$

In an expression (4), a left-to-right reaction is a charging reaction, and on the contrary, a right-to-left reaction is a discharging reaction (a reaction when a battery works toward the outside). In expressions (1) to (4), chemical compounds which precipitate on the surface of a positive current collector are lead sulfate $PbSO_4$ and lead dioxide $PbO_2$. Accordingly, lead sulfate is a reaction product relating to both of the charging reaction and a corrosion reaction. A corrosion elongation phenomenon proceeds due to the growth of these reaction products.

There is a close relation between a corrosion elongation phenomenon and intergranular corrosion as will be shown below, so that a measure against the intergranular corrosion is essential for inhibiting the corrosion elongation phenomenon in a lead current collector. This is specifically because if the intergranular corrosion could be inhibited, internal stress causing corrosion elongation can be greatly reduced. More specifically, in the lead current collector, the corrosion reaction product growing in a grain boundary exerts the force of expanding the grain boundary from side to side, when one grain boundary is viewed, as a corrosion reaction proceeds from the surface of the grain boundary toward the inside, and the corrosion reaction product grows and accumulates. By the force, a material is elongated and deformed.

Actually, many grain boundaries widely distribute on the surface of a current collector, the effect of compression or tension strongly appears on parts though depending on the location due to the interactive effect, and consequently the current collector is greatly deformed into a curved and distorted shape. The deformation tends to become obvious with reducing the thickness of the current collector. When a reaction product formed by corrosion having occurred in a grain boundary grows in the grain boundary, the walls of the grain boundary occupy the side-to-side space of a corrosion reaction product, so that there is no space in between walls of the grain boundary for the internal stress due to the growth of the corrosion reaction product to escape. Accordingly, even though the current collector is thick, basically a similar phenomenon occurs to a greater or lesser degree. In other words, higher internal stress is generated in the current collector with the progress of intergranular corrosion. The internal stress generated in lead and a lead alloy is released by the deformation of the current collector.

A corrosion reaction in a grain boundary starts from the formation of the crystal nucleus of lead sulfate, and proceeds to grow the crystals according to expressions (1) and (2). While crystal growth can be inhibited by material strength, it is a sufficient countermeasure to increase only the strength of a material. However, in reality, a method of obtaining such a strength of lead or a lead alloy as to thoroughly exceed the force of crystal growth and the ionic bonding energy of lead sulfate, and as to block the crystal growth is not found for a current-collecting material considering a high function and lightweighting, under present circumstances. In principle, the progress of remarkable intergranular corrosion is unavoidable even by increasing the material strength of a current collector, and is an alarm against a countermeasure of simply increasing the material strength of the lead current collector, for the purpose of inhibiting corrosion elongation. Specifically, when intergranular corrosion proceeds, a corrosion product grows in the grain boundary, and the force due to crystal growth works on the walls of the grain boundary, a countermeasure of receiving crystal growth and inhibiting side-to-side growth of crystals by the strength of the material is not a fundamental countermeasure. An essential technology is to inhibit the intergranular corrosion.

When the surface of a lead current collector is uniformly corroded, a so-called surface distortion phenomenon which deforms a material surface can be reduced, because there is no strong field of internal stress working from the inside of the grain boundary. When a corrosion product grows only on the surface, internal stress caused by the corrosion product has a space in the right, left and upper part of the current collector to escape, which is different from the corrosion product growing in the grain boundary, and consequently has a greatly reduced effect to corrosion elongation in comparison with the growth of the corrosion product in the grain boundary. Another reason is because a corrosion reaction product uniformly formed only on the surface of a current collector repeats three dimensional dilatation and retraction in the charging and discharging reactions of a battery, which cancels self-distortion.

For this reason, it is effective for inhibiting corrosion elongation to increase material strength, but it can not be a fundamental countermeasure when such a current collector material elicits intergranular corrosion. In order to inhibit the corrosion elongation, it is basically necessary to develop a current collector capable of inhibiting the intergranular corrosion. The corrosion elongation needs to be inhibited by using such a current collector. In order to consider a countermeasure, the basic phenomenon and mechanism of the intergranular corrosion will be discussed from a basic energy viewpoint, and the countermeasure will be studied on the basis of the result.

(Intergranular Corrosion)

A grain boundary is generally a part in which metallic elements segregate and have distorted bonds between atoms in a lattice, and accordingly is generally in a high energy state. If the energy of a system is represented by a Fermi level, the grain boundary has an element configuration having a different energy level from that of element configurations in peripheral crystal grains, because of a segregation phenomenon and the like, when microsocpically viewed in an atomic level. When a segregated element group in the grain boundary contacts with the peripheral crystal grains, generally electrons and metal ions continue migration till the Fermi levels of these systems become equal. Specifically, the crystal grain boundary is in such a greatly energetically complicated and sensitive environment that the equilibrium is deviated even by a slight external change.

Intergranular corrosion is a corrosion phenomenon caused when a crystal grain boundary is intricately affected by an outer environment, in this case, a system containing substances having different Fermi levels, such as sulfuric acid and water. The reason why the intergranular corrosion generally easily proceeds is because the sensitive energy field in the crystal grain boundary is quickly affected by external corrosion factors. The grain boundary having a high Fermi level is more easily corroded through electron transfer than the inside of grains having a low Fermi level is. When the grain boundary contains segregated metal or the like, the Fermi level in the region is often different from that in peripheral parts, and a corrosion reaction tends to proceed while starting from contacting parts of segregated elements and/or compounds with the peripheral parts. Even so-called iron, when having a super high purity, has a uniform Fermi level in a system, cannot cause electron transfer therein from an energetic viewpoint, and consequently does not cause corrosion. On the contrary, when iron has even one nonuniform portion therein, corrosion starts from the portion and proceeds. The grain boundary contains the segregated elements and has different arrangement of atoms in the lattice, and accordingly has a condition capable of being the starting point of the corrosion reaction from the various viewpoints.

(Inhibition for Intergranular Corrosion)

Accordingly, in order to inhibit intergranular corrosion, an energy level in the part has to be equal to that in the periphery thereof. However, as long as a grain boundary exists, the distortion of atomic arrangement exists. Accordingly, a realistic countermeasure for inhibiting intergranular corrosion is to decrease the segregation density of segregated elements in the grain boundary. In consideration of those, the following countermeasures (a) to (d) are considered to be main countermeasures for a current collector of a lead-acid battery.

(a) To moderate segregation phenomenon to decrease the density of starting points for corrosion in a grain boundary and decrease the density of segregated substances capable of being the starting point for intergranular corrosion.

(b) To decrease a segregation density by rolling the plate and elongating a grain boundary. At this time, it is necessary to inhibit crystal grains on a rolled surface from coarsening through recrystallization, after the plate has been rolled.

(c) To decrease the segregation density of impurities by purifying lead.

(d) To give the material enough strength to overcome generated internal stress and thereby alleviate corrosion elongation.

In a countermeasure (a), it is important to decrease the number itself of segregated elements per unit grain boundary area. It is generally an effective method to downsize crystal grains to increase the total area of the surfaces of the crystal grains and decrease the segregation density of segregated elements in a crystal grain boundary. However, lead has a recrystallization temperature of an atmospheric temperature level, so that a method of downsizing the crystal grains to increase the total area of the surfaces of the crystal grains can not be directly applied to lead or a lead alloy, because even if the crystal grains could be temporarily in ordinary pure lead or an ordinary lead alloy, the growth of the downsized crystal has to be inhibited by adding a pinning agent for inhibiting the grain growth in a material.

A countermeasure (b) is similar to a countermeasure (a), and is a method of decreasing segregation density, in other words, the precipitation density of segregated substances in a grain boundary by increasing the area of the surface of crystal grains in grain boundaries through rolling. The method needs a countermeasure for inhibiting recrystallization, because a rolled material tends to be recrystallized, form a new grain boundary and cause a segregation phenomenon.

A countermeasure (c) is a general method of reducing a substance to be the raw material of a segregating element, and moderating segregation in a grain boundary to decrease segregation density.

A countermeasure (d) is a technology of mixing carbon, an oxide and the like in a lead powder to increase the strength of a material itself, and thereby inhibiting corrosion elongation. However, the method can not be a fundamental countermeasure for a current collector made of such a lead alloy as to easily cause the intergranular corrosion that is the source of the internal stress which is the factor of corrosion elongation, unless the material can inhibit intergranular corrosion, because, as described above, even the method can not basically give the lead alloy a material strength for preventing the growth of a corrosion reaction product formed by the intergranular corrosion in a grain boundary. Accordingly, countermeasures (a) to (c) become basic countermeasures for inhibiting intergranular corrosion and corrosion elongation. As a matter of course, it is more effective as a countermeasure for inhibiting corrosion elongation to give the strength described in the countermeasure (d) to the lead current collector on which the countermeasures (a) to (c) have been completed, but if segregation phenomenon strongly appears as a result of having given the strength, and the intergranular corrosion proceeds in a higher speed, the countermeasure confuses the order of things. In addition, a technology for downsizing crystal grains generally requires additive elements capable of inhibiting crystal growth, in other words, additives having a so-called pinning effect, which are generally considered to disturb the energy balance of a system and adversely affect a corrosion phenomenon. For this reason, countermeasures (a) and (b) are not simple methods because factors associated with a bi-facial phenomenon affect each other. The countermeasure (c) is a method of super purifying a material, which is not realistic in consideration of a cost.

The present invention is based on discoveries of a method for simultaneously solving technical problems associated with methods (a) and (b), which uses a powder rolling technology of rolling atomized lead powder or an atomized lead alloy powder containing Sn or the other element respectively having the following composition (1) or (2); and of a method for preparing a current collector with the use of the rolled sheet. A method (d) is not a fundamental countermeasure, but is an additionally desirable method to a material on which the countermeasures (a) and (b) are completed and which can inhibit intergranular corrosion in a current collector made of lead or a lead alloy. Chemical compounds shown in (3) are the additives which can be added to the materials (1) and (2).

(1) Mixed Lead of Atomized Lead and Lead Oxide

Mixed lead contains pure lead and 0.05 to 3 vol. % PbO or $PbO_2$ with respect to pure lead.

(2) Mixed Lead Alloy of an Atomized Lead Alloy and Lead Oxide

A mixed lead alloy includes a Pb-0.5-3.0% Sn alloy or an alloy containing Pb-0.5-3.0% Sn and 0.01 to 3.0% Ca, Sb or Sr, and 0.05 to 3 vol. % PbO or $PbO_2$ with respect to the alloys.

(3) Additive

Lead oxide (PbO and/or $PbO_2$), silicon dioxide ($SiO_2$), aluminum oxide ($Al_2O_3$), zirconium oxide ($ZrO_2$), stannic oxide ($SnO_2$), barium metaplumbate ($BaPbO_3$), antimony trioxide ($Sb_2O_3$) and carbonized substance.

These raw material powders (1) and (2) are rolled in a process shown in FIG. 1, and are used for a current collector of a lead-acid battery.

The point of the present technology is to simultaneously achieve the above described factors (a) and (b). A lead current collector made by ordinary casting and rolling has large crystal grains growing during the process occasionally with sizes of millimeter levels. Boundaries between the crystal grains are complicated regions from the viewpoint of energy as described above, and can be the starting points of a selective corrosion reaction due to segregated elements existing there.

On the other hand, atomized lead particles are particles with sizes of several tens of microns, and the surfaces of the particles are not grain boundaries but form a free surface. Each atomized particle has an extremely low density of segregated elements therein, which is an impurity concentration level. When raw materials in the condition are collected and rolled, the particles are bonded with each other through a metallic bonding force to form a current collector. For this reason, boundaries between particles after the raw materials have been rolled can be boundary layers containing an extremely low amount of segregated elements. Thus, the above described subject (a) was solved. In addition, a process for rolling a powder contains a countermeasure against a subject (b).

In a subject (b), as described above, a pinning element for inhibiting grain growth is usually added to a material, but the addition brings a difficult aspect. This is because the coexistence of substances having different Fermi levels becomes a factor of causing intergranular corrosion, and specifically forms a microcell around them, which has the same effect as to form the starting point of corrosion. For this reason, such an additive is required as to avoid the possibility of becoming a starting point of corrosion, and have a pinning effect, specifically, the pinning effect for inhibiting grain growth and decreasing the concentration of segregated substances in a crystal grain boundary.

A lead current collector is placed in a thermodynamically corrosive electric potential region in a working environment of the battery as described above, and one of own corrosion products is a lead oxide. Among the oxides, $PbO_2$ formed through PbO is a reaction active material itself, and even in super high purity lead, the combination of a current collector and the oxide is thermodynamically stable when they uniformly form an interface between different phases. It means that lead oxides existing in a corroded grain boundary are natural reaction products of a base metal in itself, and are different from precipitates of segregated elements, which have a largely different energy level and cause peculiar corrosion around themselves.

In a current collector according to the present invention, from the viewpoint of an energy level or a reaction of an active material, lead oxide is concomitantly used with atomized particles as a pinning element, which was experimentally confirmed to be a method capable of simultaneously solving the above described subjects (a) and (b). In other words, lead oxides dispersed in lead or a lead alloy minimized intergranular corrosion through minimizing a difference between energy balances, which creates the starting point of corrosion in a grain boundary, and through inhibiting recrystallization, namely, inhibiting the growth of new grain boundaries, and as a result, successfully inhibited corrosion elongation.

The sectional structure of a current-collecting material thus prepared by rolling lead or a lead alloy powder, which contains a lead oxide dispersed therein, clearly shows the characteristics in the aspect ratio of crystal grains. Specifically, the aspect ratio is 3 to 13, which is different as well as a structure from a conventional one. It is effective as an additional method to add an additive element for increasing material strength to a material thus obtained according to the present invention.

As for a method for obtaining the material, a method of applying a mechanical alloying process to an atomized powder material having the above described composition is effective in addition to a powder-rolling process. The method of applying a mechanical alloying will be described below in detail. The mechanical alloying process has the advantages for improving corrosion resistance particularly in the respect of a crystal grain size, as will be described below.

Structure control by alloying is a common technology for imparting high corrosion resistance to metal. The technology for imparting high corrosion resistance to a current collector of a battery has constraints to battery characteristics themselves such as hydrogen overvoltage and oxygen overvoltage, and has thus different aspects and constraints from the technology applied to structural materials such as stainless steel. Such as in a lead-calcium-tin ternary alloy, when intergranular corrosion is a problem, high corrosion resistance can be given by controlling a grain into a small size. This is because in a constant potential environment of a battery, the control of a grain into a small size increases the total length of crystal grain boundaries per unit weight or per unit area, extends the rupture life because of increased length for corrosion, and provides high corrosion resistance, unless it gives a basically harmful effect to a corrosion reaction mechanism and a corrosion rate. In a constant current environment of a battery as well, the control of the grain into the small size shows a similar effect of imparting high corrosion resistance because a corrosion current per unit length of grain boundaries is reduced due to the increased total length of crystal grain boundaries, unless it gives a basically harmful effect to the corrosion reaction mechanism and particularly the intergranular corrosion rate.

However, lead causes recrystallization even in an atmospheric temperature range, as described above, and accordingly requires the addition of additional elements and compounds having a so-called pinning effect for inhibiting grain growth to an alloy, in order to control crystal grains into a small size. When the concentration of segregated substances in a grain boundary becomes high due to the addition of a pinning element, an intergranular corrosion rate increases though the crystal grains are downsized, and the effect of inhibiting corrosion elongation is not seen. The present invention provides a method for preparing a lead current collector which has particularly a superior effect of inhibiting intergranular corrosion and consequently inhibiting the corrosion elongation to a conventional lead current collector, and has high strength, as a result of dispersing carbon and a lead oxide in lead with the use of a mechanical alloying (MA) process which is one of powder metallurgy.

When a current collector of a lead-acid storage battery is made of lead or a lead alloy having carbon or a carbon nanotube dispersed therein together with a lead oxide through a MA process, it shows not only refined crystal grains but also a function of inhibiting a charging and discharging function from degrading in a lead-acid battery, caused by a passivated film mainly consisting of lead monoxide (PbO) which is formed on the surface of lead of the current collector. Specifically, the current collector makes a carbonized substance contained therein incorporated in a passivated film formed by spontaneous corrosion on a lead surface, acquires a passage for electrons to conduct formed in the passivated film, and shows a function which has not been seen in a conventional lead-acid battery. When a carbonized substance is a carbon nanotube, stability in a cathodic lead current collector is further improved by the chemical stability and mechanical strength of the nanotube.

By adding a carbonized substance of electric conductors and ceramic such as $SiO_2$ and $Al_2O_3$ into lead similarly with the use of a MA process, a lead current collector comprising grains with sizes of 10 μm or less can be easily prepared. In consideration that a conventional lead alloy has grains with sizes of 100 micrometer level or larger, grains with sizes under 10 micrometers in a current collector according to the present invention lead to great improvement in the point of the total length of crystal grain boundaries. Furthermore, when a lead current collector employs a mixture of atomized lead powder and a lead oxide for a raw material, it remarkably reveals the effect of decreasing the concentration of segregated substances, a pinning effect, and the effects of inhibiting intergranular corrosion and corrosion elongation.

A MA process can make composite particles amorphous, and may completely solve the problems of a conventional lead alloy with intergranular corrosion. A current collector of lead or a lead alloy prepared with a method on the basis of powder metallurgy as described above has basically different properties from those of the current collector of lead or a lead alloy obtained from a conventional lead molten metal, in the following points:

(A) refined crystal grains
(B) improved material strength
(C) amorphous material
(D) conduction passage of electrons formed in passivated film on the surface of a current collector by carbonized substance particles contained therein.

The improved material strength described in (B) is related to refined crystal grains described in (A), and the relationship is shown by the expression (5) of a Hall-Petch's relation.

$$\sigma_y = \sigma_0 + AG^{-1/2} \quad (5)$$

Here, $\sigma_y$ is yield strength, $\sigma_0$ and A are material constants and G is a grain size. According to an expression (5), yield strength is proportional to the inverse of the square root of a grain size, and accordingly the smaller are crystal grains, the higher is material strength. The expression (5) shows that when a composite lead material is prepared with an MA process in the above described powder metallurgy techniques, the strength of the material can be also improved.

Accordingly, a lead current collector having grains controlled into small sizes due to a pinning effect and high corrosion resistance achieved can be composed into a thin and light shape.

A MA process may employ a planet ball mill or an attritor mill, but when employing the attritor mill, the process can form uniform composite particles, because the attritor mill accommodates a material to be mixed and grinding balls in a fixed vessel and has a rotary vane and a drive shaft for driving the rotary vane, repeats cold jointing and crushing between materials accommodated in a vessel, and grind the materials. A lead powder obtained through the MA process is solidified by ordinary hot solidification and is rolled. Then, the product is used as a current collector. Impalpable powders of lead and a lead alloy which are a base for preparing a composite material can be obtained with a gas atomization method.

As described above, the present invention can be expanded to the development of various lead current collectors based on a conventional powder metallurgy technique, and the base is to reduce internal stress by inhibiting intergranular corrosion.

The present invention can inhibit intergranular corrosion and consequent corrosion elongation of a current collector in a lead-acid battery, consequently can improve the reliability and durability of the positive electrode in a lead-acid storage battery, and accordingly can provide a technology for improving the reliability and efficiency of the lead-acid storage battery and a system using a lead-acid storage battery.

DENOTATION OF REFERENCE NUMERALS

1 corroded layer, 2 metallic current collector phase, 3 deep intergranular-corroded part, 4 negative plate, 5 positive plate, 6 separator, 7 plate group, 8 battery case, 9 electrolytic solution, 10 positive terminal, 11 negative terminal, 12 lid, 13 carbon particle, 14 aluminum oxide, 15 active material layer, 16 passivated film layer, 17 lead current collector, 18 joined part between atomized lead particles

DETAILED DESCRIPTION OF THE PREFERRED EMBODIMENTS

Referring to specific examples, the present invention will be now described in further detail below, but the present invention is not limited to the examples unless being beyond the purpose of the present invention.

EXAMPLE 1

(Experiment)

Rolled sheets each with a thickness of 0.2 mm were prepared by charging gas-atomized powders of Pb, a Pb-1.5% Sn alloy, a Pb-2.5% Sn alloy, and a mixed powder of the above described Pb powder and the Pb-2.5% Sn alloy powder at a ratio of 1:1, each of which contains 0.1 vol. % PbO and has an average particle diameter of 20 to 25 μm, between horizontally arranged rolls; and cold-rolling each powder. The rolled sheets were subjected to the observation of a microstructure, a tensile test and a corrosion test, and the results were compared to a conventionally cast and rolled material.

Figure 1:
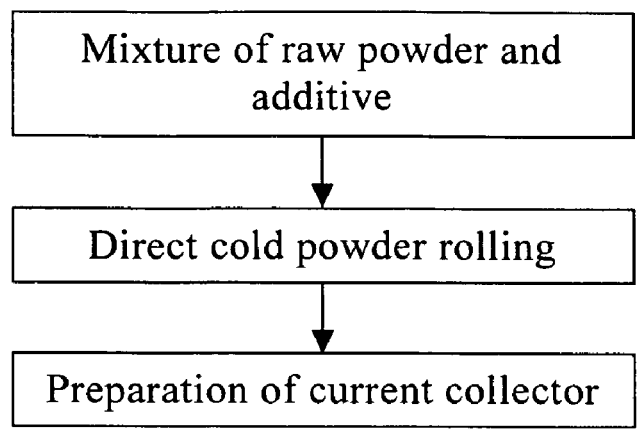
FIG. 1 shows a process for preparing a current collector of a lead-acid battery through rolling a raw powder.
Figure 2:
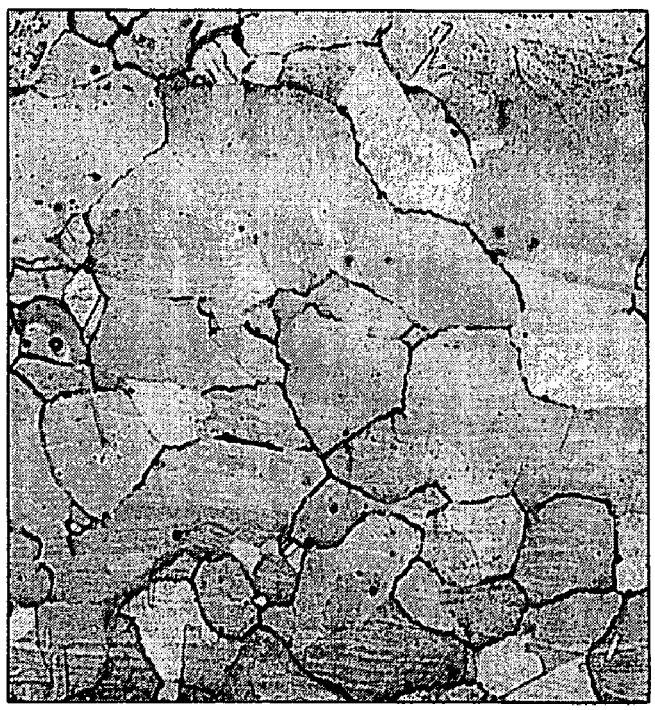
FIG. 2 shows a sectional structure observed with an optical microscope, of a conventionally cast and rolled Pb-1.5% Sn alloy (Example 1)
Figure 3:
FIG. 3 shows a sectional structure observed with an optical microscope, of a material prepared by mixing 0.1 vol. % PbO with atomized Pb powder and rolling the mixture (Example 1)
Figure 4:
FIG. 4 shows a sectional structure observed with an optical microscope, of a material prepared by mixing 0.1 vol. % PbO with an atomized powder of a Pb-1.5% Sn alloy and rolling the mixture (Example 1)
Figure 5:
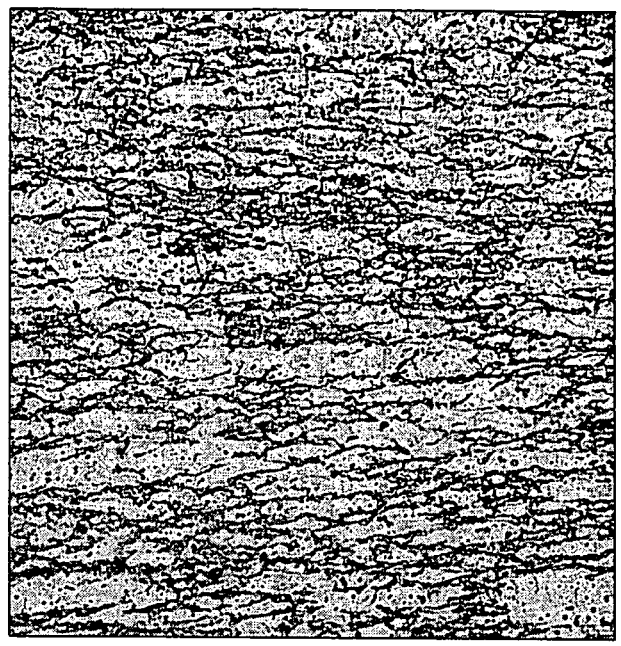
FIG. 5 shows a sectional structure observed with an optical microscope, of a material prepared by mixing 0.1 vol. % PbO with an atomized powder of a Pb-2.5% Sn alloy and rolling the mixture (Example 1)
Figure 6:
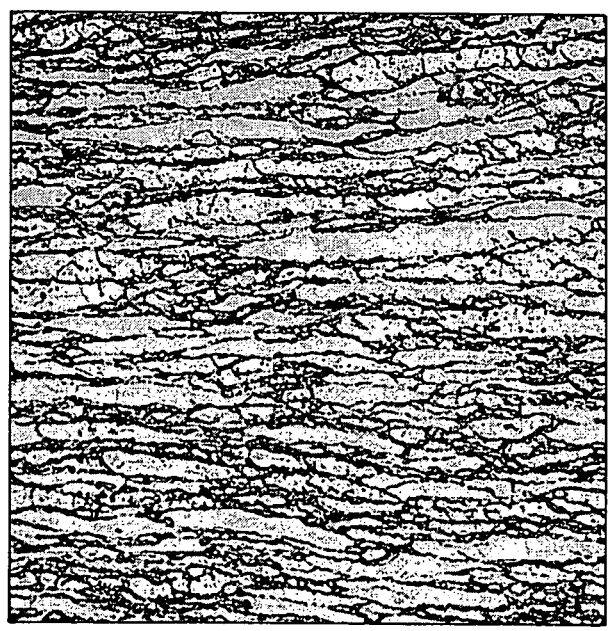
FIG. 6 shows a sectional structure observed with an optical microscope, of a material prepared by mixing 0.1 vol. % PbO with atomized Pb powder and rolling the mixture (Example 1)

FIGS. 3 to 6 show short-transverse sectional structures observed with an optical microscope, of rolled sheets according to the present invention. The upper parts of photographs are the directions of rolled surfaces. FIGS. 3, 4, 5 and 6 are the sectional micro photographs of materials obtained by charging gas-atomized powders respectively of Pb, a Pb-1.5% Sn alloy, a Pb-2.5% Sn alloy, and a mixed powder of the Pb powder shown in the FIG. 3 and the Pb-2.5% Sn alloy powder at a ratio of 1:1, each of which contains 0.1 vol. % PbO, between horizontally arranged rolls and by cold-rolling each of them. FIG. 2 shows a short-transverse sectional structure observed with an optical microscope, of a conventionally cast and rolled Pb-1.5% Sn material. The Pb-1.5% Sn alloy of a comparative material prepared by a conventional casting and rolling method shown in FIG. 2 shows an isotropic structure consisting of recrystallized and coarsened crystal grains having aspect ratios between 1 and 2, whereas a material according to the present invention shows a fine rolled structure consisting of crystal grains which are oriented in a rolling direction and have aspect ratios approximately between 3 and 13.

These powder-rolled current-collecting materials are subjected to a corrosion test and the intergranular corrosion resistance was examined. A test piece of 10 mm×100 mm×0.2 mmt was collected from a rolled material and was subjected to a constant voltage cyclic corrosion test which repeats charging at 2.5 V for six hours in a sulfuric acid electrolytic solution of 75° C. and having the specific gravity of 1.28 (at 20° C.) and leaving for six hours, continuously for four weeks. After the test, the test pieces were subjected to the measurement of elongation in a length direction (a rolling direction) and a width direction. In addition, the test pieces were cut and polished, and then subjected to the measurement of an intergranular-corroded depth with the use of a laser microscope.

Figure 7:
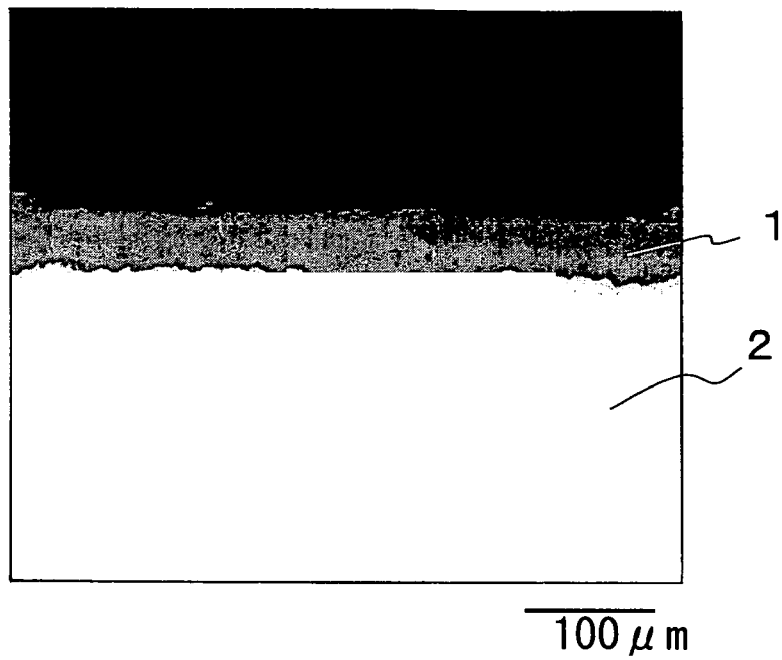
FIG. 7 shows the section of the material which was prepared by mixing 0.1 vol. % PbO with an atomized powder of a Pb-1.5% Sn alloy and rolling the mixture, and was corroded at 75° C. of a overcharging region for four weeks (Example 1)

Table 1 shows the results of having evaluated test pieces obtained by rolling various raw powders which include atomized raw powders of lead having various compositions mixed with PbO or PbO$_2$, and raw powders containing the above atomized raw powders and additives. It is clear from Table 1 that a powder-rolled material remarkably reduces the intergranular-corroded depth and has the effect of inhibiting corrosion elongation, in comparison with a conventionally cast and rolled material. Any test piece of a powder-rolled material has crystal grains with aspect ratios in a range of 3 to 13. FIG. 7 shows the section of the rolled material which was prepared by mixing 0.1 vol. % PbO with an atomized powder of a Pb-1.5% Sn alloy and corroded in the corrosion test conducted in the above described corrosion test conditions. FIG. 7 shows the section of the conventionally cast and rolled Pb-1.5% Sn alloy which was corroded by the corrosion test conducted in the above described corrosion test conditions. In FIG. 7, a corroded layer 1 of the powder-rolled material mixed with PbO forms a uniform phase, and a metallic current collector phase 2 shows no progress of intergranular corrosion therein.

TABLE 1

| | composition | intergranular-corroded depth (μm) | elongation (%) |
|---|---|---|---|
| the present invention (powder rolling) | Pb-0.1 vol. % PbO | 5.8 | 1.2 |
| | Pb-1.5% Sn-0.1 vol. % PbO | 4.7 | 1.1 |
| | Pb-2.5% Sn-0.1 vol. % PbO | 4.0 | 0.8 |
| | (Pb/Pb-2.5% Sn)-0.1 vol. % PbO | 4.3 | 1.0 |
| | Pb-2 vol. % BaPbO$_3$-0.1 vol. % PbO | 7.5 | 1.6 |
| | Pb-2 vol. % SnO$_2$-0.1 vol. % PbO | 4.8 | 2.2 |
| | Pb-2 vol. % C-0.1 vol. % PbO | 4.3 | 1.0 |
| | Pb-1.5% Sn-2 vol. % BaPbO$_3$-0.1 vol. % PbO | 7.2 | 1.8 |
| | Pb-1.5% Sn-2 vol. % SnO$_2$-0.1 vol. % PbO | 4.7 | 1.6 |
| | Pb-1.5% Sn-2 vol. % C-0.1 vol. % PbO | 3.9 | 2.2 |
| | Pb-1.5% Sn-0.2 vol. % PbO | 5.6 | 1.0 |
| | Pb-1.5% Sn-0.5 vol. % PbO | 5.2 | 1.5 |
| | Pb-1.5% Sn-1.0 vol. % PbO | 5.1 | 1.0 |
| | Pb-1.5% Sn-0.2 vol. % PbO$_2$ | 5.5 | 1.0 |
| | Pb-1.5% Sn-0.2 vol. % PbO$_2$ | 4.9 | 1.4 |
| | Pb-1.5% Sn-0.2 vol. % PbO$_2$ | 5.5 | 1.3 |
| comparative material (cast and rolled) | Pb | 31.5 | 7.2 |
| | Pb-1.5% Sn | 36.0 | 8.4 |

Figure 8:
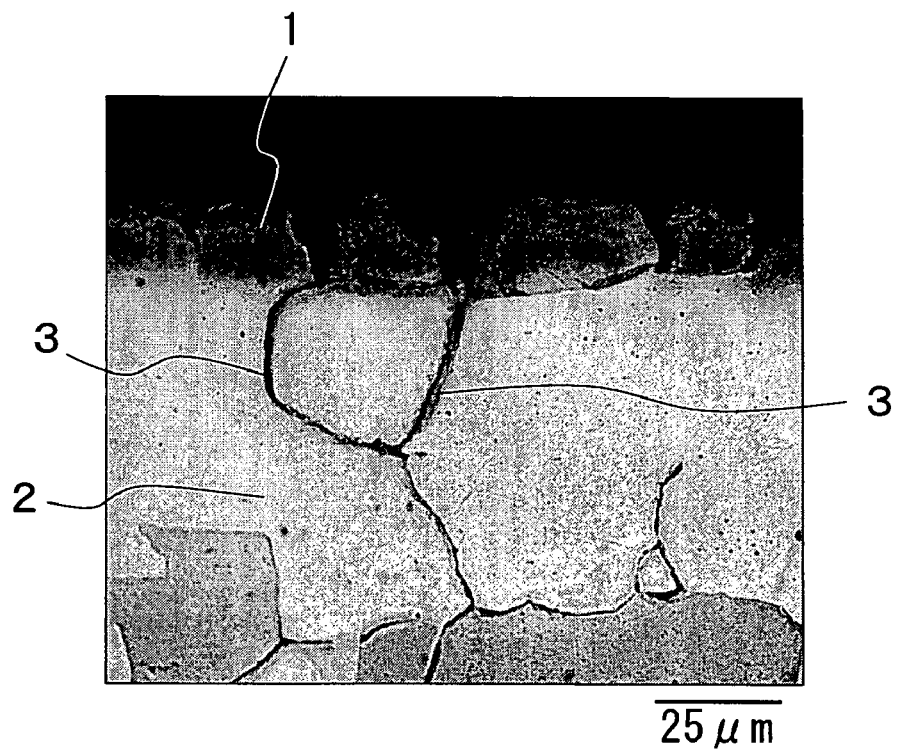
FIG. 8 shows the section of a conventionally cast and rolled Pb-1.5% Sn alloy which was corroded at 75° C. of an overcharging region for four weeks (Example 1)

On the other hand, in a corroded layer 1 shown in FIG. 8, large cracks were observed, and deeply progressing intergranular corrosion was observed in a part of a metallic current collector phase 2 as shown in the FIG. 8. A powder-rolled current collector mixed with PbO has obviously the effect of inhibiting intergranular corrosion.

Table 2 shows the tensile strength of a powder-rolled material according to the present invention and a comparative material. Test pieces were collected parallel to a rolling direction. A material according to the present invention shows improved tensile strength owing to a fine structure as is observed in FIGS. 3 to 6, and reinforcement by additives. In addition, tensile strength in a sheet width direction was approximately equal to that in the rolling direction, and anisotropy due to rolling was not particularly recognized. It was confirmed that the material according to the present invention inhibited intergranular corrosion and improved strength. It can be estimated from the Hall-Petch's relation that the material according to the present invention improved the strength, because the material consists of small crystal grains as is clear from an observation result for an etched sectional microstructure. The powder of lead or a lead alloy used in the above examples was prepared with an atomization method, but the powder has only to have a free surface from a concept according to the present invention, and is not limited to the powder prepared with the atomization method.

TABLE 2

| | composition | tensile strength (kgf/mm$^2$) |
|---|---|---|
| the present invention (powder-rolled) | Pb-0.1 vol. % PbO | 2.7 |
| | Pb-1.5% Sn-0.1 vol. % PbO | 3.4 |
| | Pb-2.5% Sn-0.1 vol. % PbO | 3.6 |
| | Pb + Pb-2.5% Sn + 0.1 vol. % PbO | 3.4 |
| | Pb-2 vol. % BaPbO$_3$-0.1 vol. % PbO | 3.3 |
| | Pb-2 vol. % SnO$_2$-0.1 vol. % PbO | 4.0 |
| | Pb-2 vol. % C-0.1 vol. % PbO | 3.6 |
| | Pb-1.5% Sn-2 vol. % BaPbO$_3$-0.1 vol. % PbO | 3.2 |
| | Pb-1.5% Sn-2 vol. % SnO$_2$-0.1 vol. % PbO | 4.3 |
| | Pb-1.5% Sn-2 vol. % C-0.1 vol. % PbO | 3.3 |
| | Pb-1.5% Sn-0.2 vol. % PbO | 2.9 |
| | Pb-1.5% Sn-0.5 vol. % PbO | 2.9 |
| | Pb-1.5% Sn-1.0 vol. % PbO | 3.0 |
| | Pb-1.5% Sn-0.2 vol. % PbO$_2$ | 3.1 |
| | Pb-1.5% Sn-0.2 vol. % PbO$_2$ | 2.9 |
| | Pb-1.5% Sn-0.2 vol. % PbO$_2$ | 3.0 |
| comparative material (cast and rolled) | Pb | 1.1 |
| | Pb-1.5% Sn | 2.2 |

In the next place, a structure of a lead-acid battery employing a current-collecting material according to the present invention, which is made of a gas-atomized powder of a Pb-1.5% Sn alloy containing 0.2 vol. % PbO out of materials shown in Table 1.

(Preparation of Positive Current Collector)

An employed positive current collector was prepared by rolling a gas-atomized powder of a Pb-1.5% Sn alloy containing 0.2 vol. % PbO into a rolled sheet with a thickness of 0.8 mm, and working it into an expanded metal.

(Preparation of Negative Plate)

A negative electrode plate was prepared by the steps of: at first, adding 0.3 wt. % lignin, 0.2 wt. % barium sulfate or 0.1 wt. % strontium sulfate, and 0.1 wt. % carbon powder with respect to lead powder, and kneading them with a kneading machine for about 10 minutes to arrange the mixture; subsequently, adding 12 wt. % water with respect to the lead powder to the lead powder, mixing them, and further adding 13 wt. % dilute sulfuric acid (with the specific gravity of 1.26 at 20° C.) with respect to the lead powder to prepare the paste of an active material for a negative electrode; and charging 50 g of the paste of the active material for a negative electrode to a current collector made of an expanded lead alloy with the thickness of 0.8 mm; leaving the product in the atmosphere with the humidity of 95% at 50° C. for 18 hours to age it, and then leaving it at 110° C. for two hours to dry it and prepare an unformed negative electrode.

(Preparation of Positive Plate)

A positive plate was prepared by the steps of: at first mixing lead powder with 12 wt. % water with respect to the lead powder and 13 wt. % dilute sulfuric acid (with the specific gravity of 1.26 at 20° C.) with respect to the lead powder, and kneading the mixture to prepare the paste of an active material for a positive electrode; and subsequently charging 60 g of the paste of the active material for a positive electrode to a current collector made of the above described powder-rolled and expanded lead alloy, leaving the product in the atmosphere with the humidity of 95% at 50° C. for 18 hours to age it, and then leaving it at 110° C. for two hours to dry it and prepare an unformed positive plate.

(Preparation and Electrolytic Formation of Layered Battery)

Figure 9:
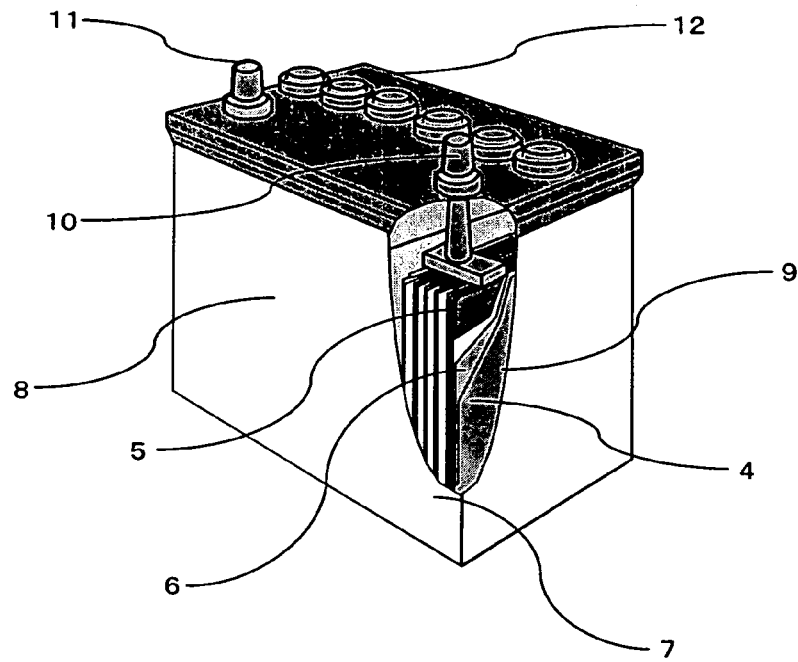
FIG. 9 is a schematic view of a lead-acid storage battery of one embodiment according to the present invention (Example 1)

FIG. 9 is a view showing an embodiment according to the present invention. Plate groups 7 were prepared by layering five sheets of unformed negative plates 4 and four sheets of unformed positive plates 5 through a separator 6 made of polypropylene, and connecting plates having the same polarity to each other with a strap. Furthermore, an unformed battery was prepared by connecting the plate groups 7 in six series, arranging them in a battery case 8, and then pouring an electrolytic solution 9 of dilute sulfuric acid with the specific gravity of 1.05 (20° C.). The unformed battery was formed at 9 amperes for 20 hours, the electrolytic solution was drained, and the electrolytic solution of a dilute sulfuric acid having the specific gravity of 1.28 (20° C.) was poured into the battery again. A positive terminal 10 and a negative terminal 11 were welded and the battery case was sealed up with a lid 12 to complete a lead-acid storage battery. The capacity of the obtained battery was 28 Ah, and an average discharge voltage was 12 V.

A lead-acid battery has a configuration of serially connecting several electric cells to acquire a predetermined electric voltage. Here, the prepared battery has the discharge voltage of 12 V and the charging voltage of 14 V, but the battery having the discharge voltage of 36 V and the charging voltage of 42 V can be prepared, and the present invention is not limited to the electric voltage range. Accordingly, in the examples according to the present invention, the battery having the discharge voltage of 12 V was prepared, but various characteristics of the present invention do not change depending on the electric voltage range.

EXAMPLE 2

Figure 10:
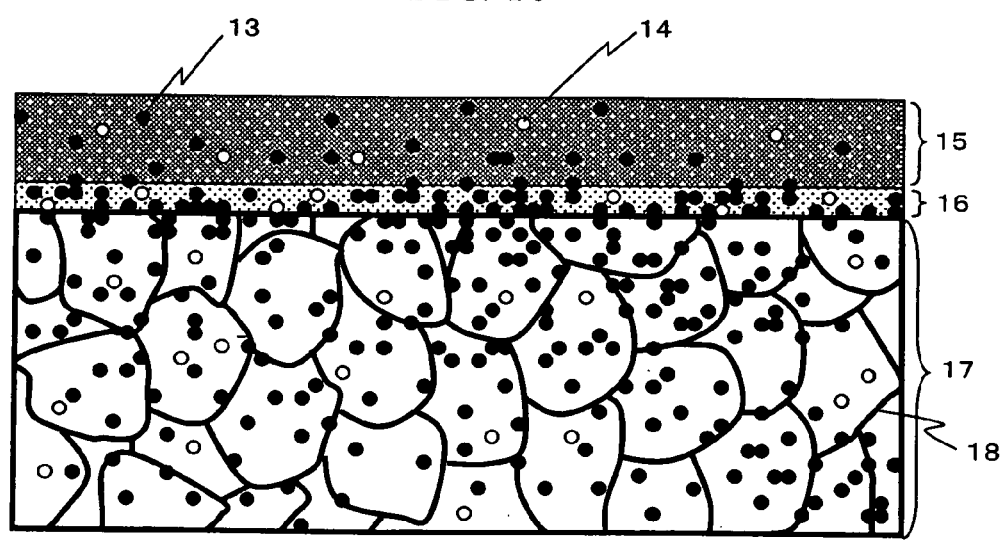
FIG. 10 is a diagrammatic sketch of a cross section of a current collector of a lead-carbon-oxide composite, an interface between the current collector and an active material, and the active material (Example 2).

FIG. 10 shows a diagrammatic sketch of a cross section of a lead current collector 17 prepared by mechanical alloying based on a method according to the present invention, an interface between the current collector and an active material, and the active material. It is shown that particles of Ketjen Black and carbon nanotubes are dispersed together with a lead oxide by mechanical alloying. Carbon particles 13 are really small, but are magnified to be drawn in FIG. 9. Aluminum oxides 14 are similar to the carbon particles 13. The dispersing state of lead oxide PbO contained in the amount of 0.2 vol. % in a raw material was omitted. An active material layer 15 is formed of a layer mainly consisting of lead dioxide $PbO_2$ and lead sulfate $PbSO_4$.

A passivated film layer 16 is formed of a layer mainly consisting of lead sulfate $PbSO_4$ and lead monoxide PbO. A lead current collector 17 is obtained by rolling and sintering lead particles with an average particle diameter of about 30 μm prepared with an atomization method. An atomized lead joined part 18 shows a joined part between atomized lead particles formed by rolling and sintering.

Carbon particles 13 dispersed in a lead current collector 17 are Ketjen Black and a carbon nanotube in the amount of 0.1 wt. %, and aluminum oxide 14 is powder with an average particle diameter of 1 μm level in the amount of 0.5 wt. %, which were dispersed among atomized lead particles by mechanical alloying. Even if these lead oxide particles, carbon particles and aluminum oxide particles are mixed with an ordinary molten lead metal, these particles move up to the surface of the molten lead metal and are not mixed with it, because they are light and have poor wettability with the molten lead metal. The carbon particles, regardless of the kinds including particles prepared by carbonization processes such as a gas phase reaction (cetylene black), a liquid-phase reaction (artificial graphite), and a solid phase reaction (carbon fiber), and Ketjen Black and a carbon nanotube shown in the present embodiment, have a similar effect of inhibiting grain growth due to recrystallization (a pinning effect).

In addition, a carbonized substance in the passive film layer 16 can play a role of providing a route for passing an electric current, which is necessary when the battery is charged or discharged, because of having electroconductive characteristics. The positive electrode of a lead-acid battery is placed in an oxidative environment in which a 2 V level of potential difference is applied between itself and a cathode. For this reason, a carbon nanotube superior in oxidation resistance is desirable as a carbonized substance. Lead-oxides and aluminum oxide play an important role in a pinning effect, and a carbonized substance plays in both of electrical conductivity and a pinning effect. In a test, particle sizes of recrystallized grains in atomized lead particles were a 5 to 10 μm level in a working environment of the battery.

In a working environment of the battery, a lead current collector 17 tends to form a passivated film layer 16 between the lead current collector 17 and an active material layer 15, due to a corrosion reaction which is a fundamental phenomenon occurring in metal like lead. Ordinarily, when a passivated film layer 16 formed of lead sulfate $PbSO_4$ completely covers a lead current collector 17, a discharging reaction and a charging reaction can not proceed in an active material layer 15, and a battery function stops. However, in a battery using a technology according to the present invention, carbon particles 13 of electronically conductive substances exist in a passive film layer 16, which have been supplied there through the elution reaction of a lead current collector 17, continuously supply the route for electronic conduction, and can provide stable battery characteristics. This is because the carbon particles dispersed in the current collector by mechanical alloying are incorporated in a passivated film layer region, due to the elution of lead of a base material in the current collector. Even if fibrous carbon replaces carbon particles 13, it shows a similar effect.

In the present embodiment, a lead current collector 17 had a material yield strength improved to a 60 MPa level from a 20 MPa level because of having lowered the grain size. Thereby, in the preparation of a wound type battery using a thinned material with a thickness of several tens of microns, problems such as the breaking of a thin lead current collector in the middle of an operation disappeared, and the winding workability was improved.

In addition, as a result of a corrosion test, as will be described later, of overcharging a prepared lead current collector 17 in a sulphuric acid solution of 20° C. having the specific gravity of 1.280 for four weeks, the lead current collector 17 showed the effect of greatly improving intergranular corrosion resistance and corrosion elongation compared to a conventional cast and rolled material (a lead tin alloy containing calcium), because of having decreased the concentration of segregated elements in grain boundaries. Specifically, a current collector made of an ordinary lead tin alloy containing calcium showed intergranular corrosion after the test, and the average intergranular-corroded depth of 4 μm, whereas a lead current collector 17 of a lead-carbonoxide composite containing PbO prepared by mechanical alloying did not show intergranular corrosion.

A corrosion test was conducted with the use of a constant-current-controlling device (a galvanostat), so as to simulate an overcharging environment in which a current collector of a lead-acid storage battery is remarkably corroded. The corrosion test was conducted at a current density of 20 miliamperes/cm$^2$ and at 20° C., while using a lead plate as a counter electrode and setting a distance between a developed lead alloy (a lead current collector 17) and the counter electrode to 1 cm.

Even though aluminum oxide 14 used in the present test will be replaced by silicon dioxide ($SiO_2$), zirconium oxide ($ZrO_2$), stannic oxide ($SnO_2$) or barium metaplumbate ($BaPbO_3$) having a perovskite structure, each compound shows a similar effect of inhibiting crystal growth. In the present embodiment, carbonized substances and oxide systems were dispersed together in atomized lead in such a range as not to adversely affect intergranular corrosion, but even when the particles of either a carbonized substance or an oxide are singly dispersed in the atomized lead particles, a similar effect of inhibiting recrystallization growth is provided.

A powder-rolled material obtained by mixing a metal powder and the oxide powder of the metal itself may show the same effect of inhibiting intergranular corrosion as is shown in the present invention. In this respect, the present invention can be applied to other functional materials and structural materials which may cause a problem with intergranular corrosion when used in a corrosive environment, and are required to have intergranular corrosion resistance.

What is claimed is:

1. A current collector for a lead-acid storage battery wherein the current collector having an active material on the surface is made of lead or a lead alloy which has crystal grains having aspect ratios between 3 and 13 and oriented in a particular direction, and includes at least one of lead oxide (PbO) and lead peroxide (PbO2) in grain boundaries and crystal grains.

2. The current collector for a lead-acid storage battery according to claim 1, wherein the lead alloy is one or more alloys selected from the group consisting of a tin-containing lead alloy (Pb—Sn), a tin-calcium-containing lead alloy (Pb—Sn—Ca), a tin-antimony-containing lead alloy (Pb—Sn—Sb), a tin-strontium-containing lead alloy (Pb—Sn—Sr) and a tin-barium-containing lead alloy (Pb—Sn—Ba).

3. A method for producing a current collector for a lead-acid storage battery, wherein the current collector material for a lead-acid storage battery used in claims 1 to 2 is prepared through the steps of: producing lead powder and/or a lead alloy powder with an atomization method; and rolling the lead powder and/or the lead alloy powder.

* * * * *